Dec. 16, 1947.    J. R. CRAWFORD    2,432,726
TRACTOR-MOUNTED POWER-DRIVEN SAWING MACHINE
Filed Nov. 6, 1944    3 Sheets-Sheet 1
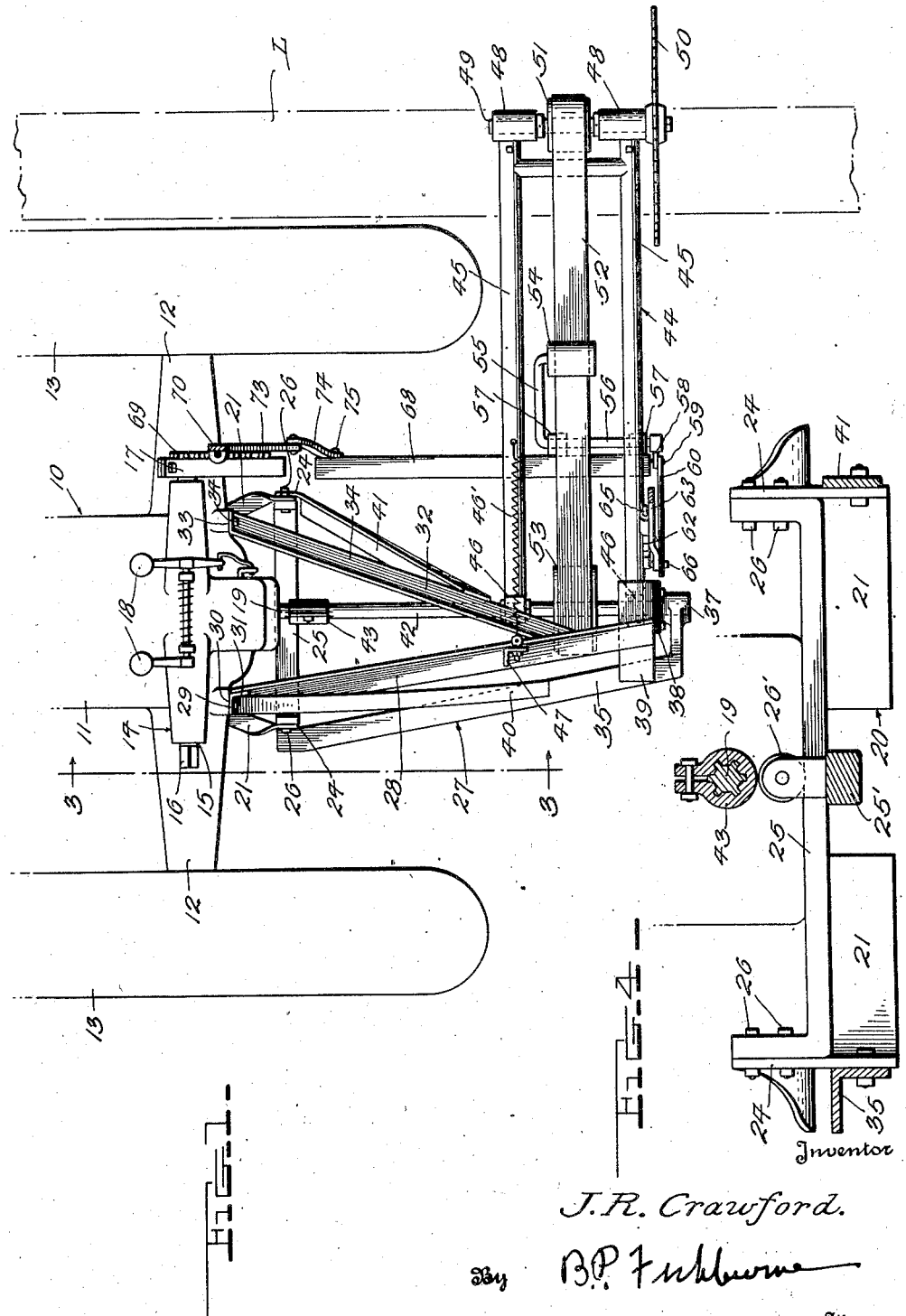
Inventor
J. R. Crawford.
By B.P. Fishburne
Attorney

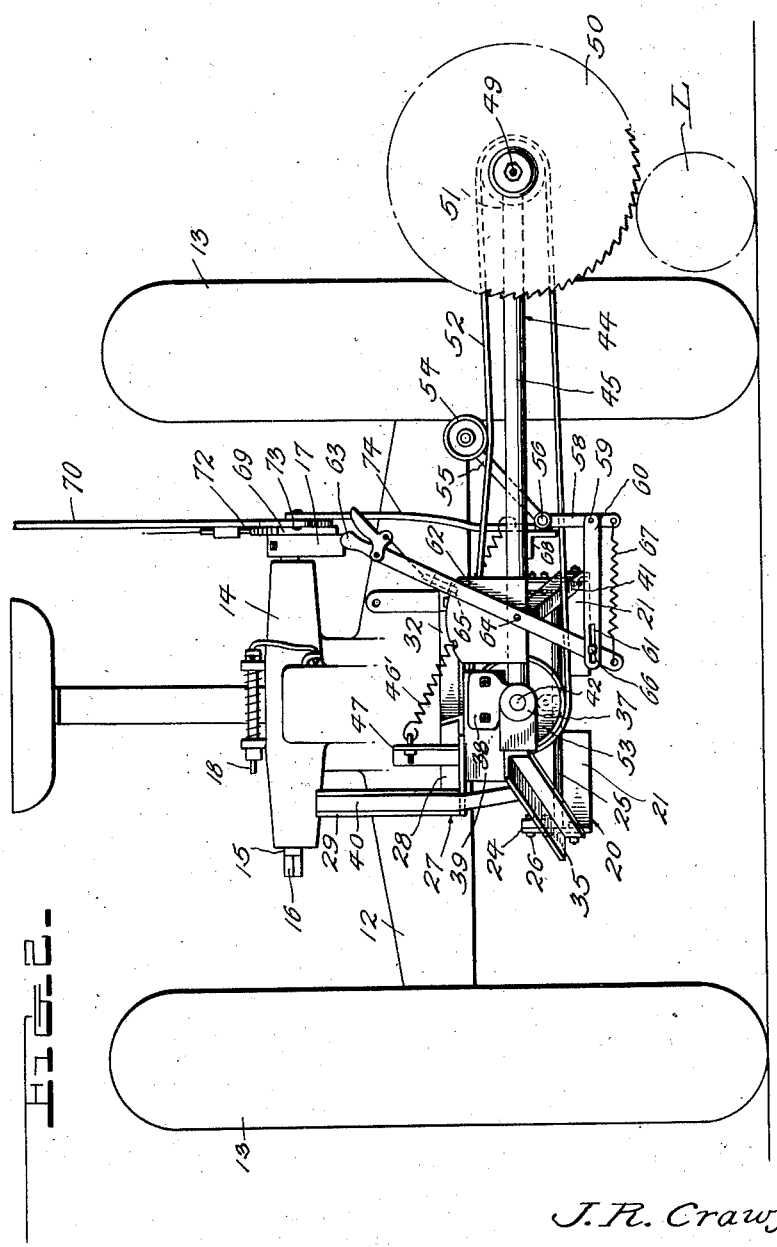

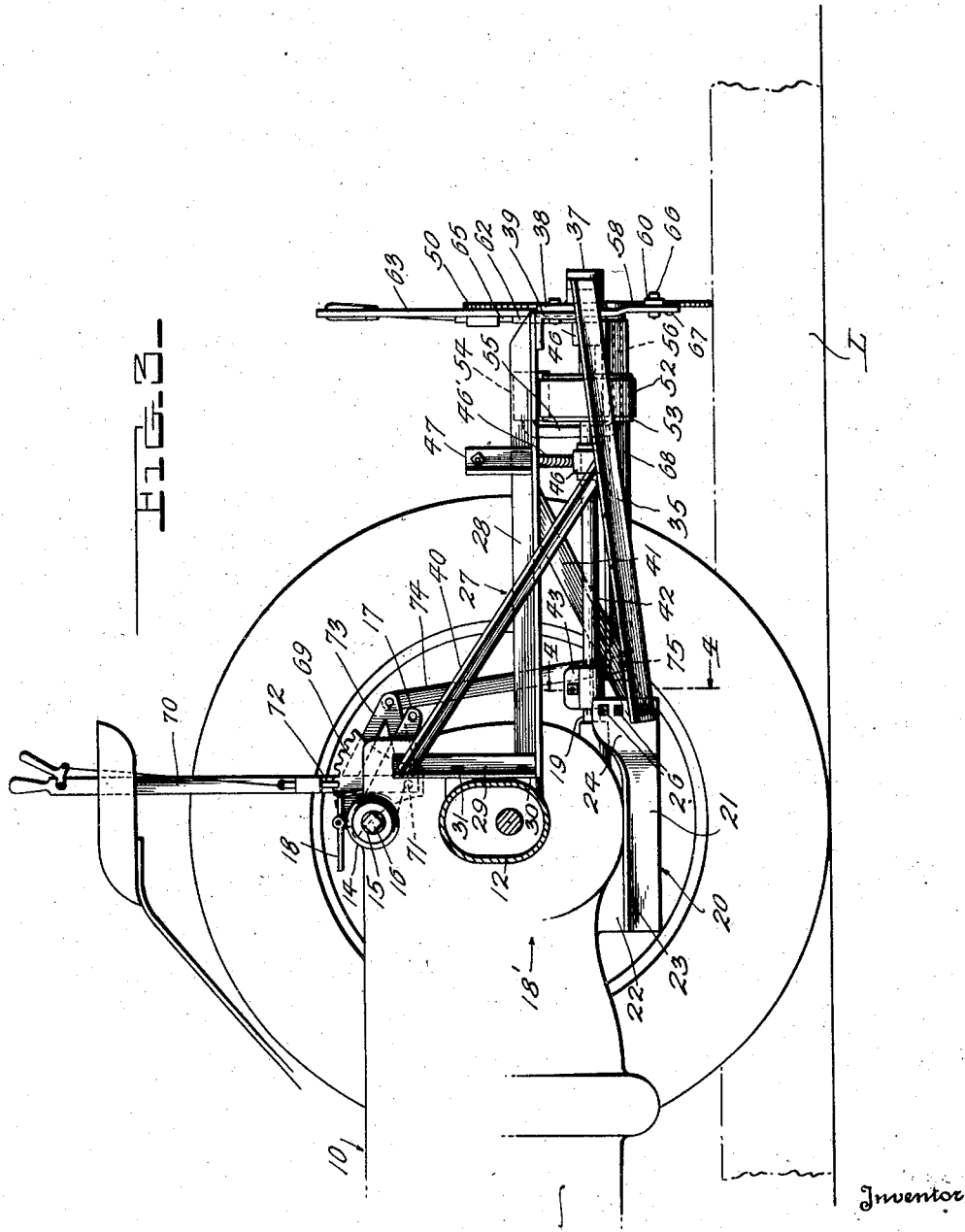

Patented Dec. 16, 1947

2,432,726

UNITED STATES PATENT OFFICE 2,432,726

TRACTOR-MOUNTED POWER-DRIVEN SAWING MACHINE

James R. Crawford, Clinton, S. C.

Application November 6, 1944, Serial No. 562,116

3 Claims. (Cl. 143—43)

My invention relates to power driven portable saws.

An important object of the invention is to provide apparatus of the above mentioned character which may be arranged at the rear of a tractor and mounted upon the same, for cutting a log or the like upon the ground.

A further object of the invention is to provide apparatus of the above mentioned character having means whereby the saw is lowered into proximity to the log by the hydraulic lift of the tractor, while the sawing action is controlled by manually operated means.

A further object of the invention is to provide means whereby the action of the saw may be controlled by the operator while sitting in the driver's seat of the tractor.

A further object of the invention is to provide apparatus of the above mentioned character which is in the nature of an attachment to be applied to a tractor without materially altering the construction of the tractor.

A further object of the invention is to provide adjustable means for regulating the tension of the belt which drives the saw.

Other objects and advantages of the invention will be apparent during the course of the following description.

In the accompanying drawings forming a part of this application and in which like numerals are employed to designate like parts throughout the same, Figure 1 is a plan view of a power driven portable saw embodying my invention, Figure 2 is an end elevation of the same, Figure 3 is a longitudinal section taken on line 3—3 of Figure 1, Figure 4 is a transverse section taken on line 4—4 of Figure 3.

In the drawings, wherein for the purpose of illustration is shown a preferred embodiment of my invention, the numeral 10 designates a tractor as a whole, such as a John Deere tractor. This tractor includes the usual frame or chassis 11, to the rear end of which the axle housing 12 is secured. The numeral 13 designates the rear tractor wheels.

The tractor is equipped with a hydraulic lift, including a transverse housing 14, within which is mounted a horizontal transverse shaft 15, having square ends 16, receiving thereon cranks or arms 17. These arms 17 may be generally horizontal when the shaft 15 is turned forwardly to the end of its movement. The numeral 18 designates pedal or pedals which when depressed and released serves to actuate the hydraulic lift. When the pedal 18 is depressed and released the shaft 15 turns in one direction for its entire movement and when the pedal is again depressed and released the shaft 15 will turn in an opposite direction for its entire movement. This hydraulic lift is usually employed for raising and lowering parts of agricultural implements which are attached to the rear of the tractor. The hydraulic lift is shown in Patents 2,197,848 and 2,342,306.

Only one arm or crank 17 may be employed in connection with my power driven saw. The gear casing 18' of the tractor is equipped with the usual longitudinal power take-off shaft 19.

The numeral 20 designates an attaching unit which is rigidly secured to the rear end of the tractor. This unit includes horizontal angle-irons 21, which are bolted to flats 22, as shown at 23. The angle-irons 21 have their rear ends formed into vertical webs 24. Arranged between the vertical webs 24 is a U-shaped bar 25, which is bolted to the webs 24, as shown at 26. Arranged beneath the bar 25 is the usual drawbar 25', Fig. 4, supported by a roller 26' travelling upon the upper face of the bar 25. The foregoing description is that of the conventional John Deere tractor.

My invention embodies a frame 27 which is disposed at the rear of the tractor and extends axially thereof and projects rearwardly of the tractor wheels 13. This frame includes an upper generally horizontal angle-iron 28, the forward end of which is welded to a vertical angle-iron 29, rigidly secured to a flat 30 by bolts 31. The vertical angle-iron 29 projects above the horizontal angle-iron 28, as shown. The numeral 32 designates a companion upper generally horizontal angle-iron, the forward end of which is rigidly secured to a flat 33 by a bolt 34. The angle-irons 28 and 32 converge rearwardly and are rigidly connected by welding or the like. The numeral 35 designates a lower longitudinal angle-iron arranged adjacent to the angle-iron 28 and extending longitudinally thereof and having its forward end attached to the web 24 by one of the bolts 26. This angle-iron 35 has a bearing 37, rigidly secured to its rear end, and this bearing is provided with a flange 38, which is bolted to an angle-iron 39, arranged beneath and rigidly secured to the angle-iron 28 by welding or the like. A diagonal brace or angle-iron 40 is rigidly secured at its rear end to the angle-iron 35, by welding or the like, and this diagonal angle-iron extends above the angle-iron 28 and is rigidly secured to the top of the vertical angle-iron 29 by welding or the like, Figure 3. The numeral 41 designates a diagonal brace or angle-iron, the upper end of which is rigidly attached to the angle-iron 32, while its lower end is attached to the web 24 by one of the bolts 26.

The numeral 42 designates a longitudinal drive shaft, having its rear end rotatably held in the bearing 37 and its forward end is rigidly secured to the power take-off shaft 19, to rotate therewith, by a coupling 43.

The numeral 44 designates a vertically swinging saw carrying frame, which is U-shaped and includes spaced arms 45, provided at the inner ends with sleeves 46, pivotally mounted upon the drive shaft 42. A retractile coil spring 46' is attached to one arm 45 and to an upright 47, rigidly secured to the angle-iron 28. The arms 45 are provided at their outer ends with bearings 48, receiving a rotatable spindle or arbor 49, having a rotary saw 50 rigidly secured thereto. This saw rotates in a vertical plane transversely of the tractor. The spindle 49 has a pulley 51 rigidly secured thereto, engaged by a belt 52, engaging a pulley 53, in turn rigidly mounted upon the drive shaft 42.

Means are provided to regulate the tension of the belt 52, including a tension pulley 54, arranged above the upper run of the belt 52 and mounted upon a vertically swinging arm 55, carried by a rock-shaft 56, journaled in bearings 57, as shown. The rock-shaft 56 has a depending crank 58, pivotally connected at 59 with a link 60 and this link has a longitudinal slot 61. Rigidly mounted upon the rear arm 45 is a stationary toothed quadrant 62, having a lever 63 pivoted thereto at 64. This lever is equipped with a latched device 65, for co-action with the toothed quadrant 62. The lever 63 has a bolt 66 rigidly secured to its lower end and this bolt is slidable within the slot 61. Arranged beneath the link 60 is a retractile coil spring 67, one end of which is attached to the crank 58 and the opposite end to the lever 63. When the lever 63 is locked in the forward position, Figure 2, the spring 67 is free to yieldingly hold the tension pulley 54 against the upper run of the belt. When the lever 63 is swung rearwardly and locked in the rear position, the bolt 66 will engage the forward end wall of the slot 61 and the link 60 will then raise the tension pulley 54 from the belt.

Means are provided to raise and lower the saw carrying frame 44 including a horizontal bar or angle-iron 68, disposed beneath the arms 45 and welded thereto. The bearings 57 are secured to the angle-iron 68. The crank or arm 17 of the hydraulic lift has a toothed quadrant 69 rigidly secured thereto by welding or the like. A lever 70 is pivoted upon the toothed quadrant at its lower end, as shown at 71. The lever 70 has a latched device 72 for co-action with the toothed quadrant. The lever 70 is provided with a rearwardly projecting crank 73, rigidly secured thereto. This crank has pivotal connections with a depending link 74, the lower end of which is pivotally connected with a pin 75, secured to the horizontal angle-iron 68, as shown.

The operation of the apparatus is as follows:

The tractor has been driven to one side of the log L and brought to rest. The saw 50 is now rotating and the operator depresses and releases the pedal 18 and the hydraulic lift is actuated to swing the crank 17 and crank 73 downwardly. When these cranks reach the end of their down travel, the saw 50 is ordinarily in close proximity to the log L but not engaging therewith. When the crank 17 has reached the end of its down-stroke, crank 73 is further lowered by swinging the lever 70 rearwardly. This downward movement of the crank 73 lowers the frame 44 which moves the saw downwardly to cut the log. The operator by holding the lever 70 can control the cutting action of the saw, forcing it downwardly as the cutting proceeds, and slightly raising the saw if there is a tendency for the log to pinch. After the log is cut the lever 70 is returned to the forward position, Figure 3, and locked in this position, after which pedal 18 is again depressed and released, and the crank 17 moves upwardly, whereby crank 73 raises the saw carrying frame. The saw is now elevated above the log so that the saw may be positioned at the next sawing point.

It is to be understood that the form of my invention herewith shown and described is to be taken as a preferred example of same, and that various changes in the shape, size and arrangement of parts may be resorted to without departing from the spirit of my invention or the scope of the subjoined claims.

Having thus described my invention, what I claim is:

1. The combination with the hydraulic lift of a tractor, said lift including a vertically swinging arm to be shifted to raised and lowered positions, means for controlling the operation of the lift, a manually operated lever pivoted upon the swinging arm, a crank rigidly secured to the lever and to be swung in a vertical plane when the lever is swung upon its pivot, means to lock the lever against swinging movement upon its pivot, the crank swinging in a vertical plane with the arm when the arm is swung in a vertical plane and the lever is locked against swinging movement upon its pivot, a supporting frame at the rear of the tractor, a drive shaft carried by the supporting frame and extending longitudinally of the supporting frame and secured to the power take off shaft of the engine, a swinging frame carried by the supporting frame, a saw carried by the swinging frame, driving connecting means between the saw and drive shaft, and means connecting the swinging frame and crank.

2. The combination with the hydraulic lift of a tractor including a horizontal rock shaft, a support rigidly mounted upon the rock shaft to turn therewith, a vertically swinging lever pivoted upon the support, a crank rigidly secured to the lever and extending generally radially of the rock shaft, means to lock the lever against turning movement upon its pivot, the crank being swung in a vertical plane by swinging the lever when the rock shaft is stationary and the crank being swung in a vertical plane by the rock shaft when the lever is locked against swinging movement upon its pivot, a vertically movable frame, means to mount the frame upon the tractor, means connecting the vertically movable frame and the crank, a saw carried by the vertically movable frame, and driving connecting means between the saw and drive shaft of the tractor.

3. The combination with the hydraulic lift of a tractor, said lift including a horizontal rock shaft, a toothed quadrant rigidly secured to the rock shaft to turn therewith in a vertical plane, a manually operated lever pivoted upon the toothed quadrant, a latch carried by the lever to engage the toothed quadrant and lock the lever against swinging movement upon its pivot, a crank rigidly mounted upon the lever and swung in a vertical plane by the lever, the crank being swung in a vertical plane by the rock shaft when the lever is locked against swinging movement upon its pivot, the lever being adapted to swing the crank downwardly beyond the position to which it can be swung by the rock shaft, a vertically movable frame carried by the tractor, a saw carried by the vertically movable frame, driving connecting means between the saw and the drive shaft of the tractor, and means connecting the vertically movable frame and crank.

JAMES R. CRAWFORD.

REFERENCES CITED

The following references are of record in the file of this patent:

UNITED STATES PATENTS

| Number | Name | Date |
| --- | --- | --- |
| 1,163,891 | Caverno | Dec. 14, 1915 |
| 2,350,880 | Dellinger et al. | June 6, 1944 |
| 1,548,263 | Gentry et al. | Aug. 4, 1925 |
| 1,820,775 | Boyette | Aug. 25, 1921 |
| 2,330,996 | Rivers | Oct. 5, 1921 |